US 12,252,428 B2

(12) United States Patent
Eden et al.

(10) Patent No.: US 12,252,428 B2
(45) Date of Patent: Mar. 18, 2025

(54) SYSTEM AND METHOD FOR RECOVERING AMMONIA FROM AN AMMONIA-CONTAINING LIQUID

(71) Applicant: Process Limited, Coventry (GB)

(72) Inventors: Robert Eden, Coventry (GB); Mark Moulden, Coventry (GB)

(73) Assignee: Process Limited, Coventry (GB)

( * ) Notice: Subject to any disclaimer, the term of this patent is extended or adjusted under 35 U.S.C. 154(b) by 0 days.

(21) Appl. No.: 18/573,591

(22) PCT Filed: May 27, 2022

(86) PCT No.: PCT/GB2022/051365
§ 371 (c)(1),
(2) Date: Dec. 22, 2023

(87) PCT Pub. No.: WO2022/269229
PCT Pub. Date: Dec. 29, 2022

(65) Prior Publication Data
US 2024/0262731 A1    Aug. 8, 2024

(30) Foreign Application Priority Data
Jun. 24, 2021  (GB) ..................................... 2109092

(51) Int. Cl.
*B01D 19/00*   (2006.01)
*C01C 1/02*    (2006.01)
(Continued)

(52) U.S. Cl.
CPC ............. *C02F 9/00* (2013.01); *B01D 19/0073* (2013.01); *C01C 1/024* (2013.01); *C01C 1/10* (2013.01);
(Continued)

(58) Field of Classification Search
CPC .... C02F 9/00; C02F 1/048; C02F 1/06; C02F 1/20; C02F 1/441; C02F 1/444;
(Continued)

(56) References Cited

U.S. PATENT DOCUMENTS 5,496,778 A   3/1996   Hoffman et al.
6,065,306 A   5/2000   Ji et al.
(Continued)

FOREIGN PATENT DOCUMENTS

CN   103979708 A       8/2014
CN   106430783 A   *   2/2017   ................ C02F 9/00
(Continued)

OTHER PUBLICATIONS

English Translation of Publication JP-2010149076-A, published Jul. 2010. (Year: 2010).*
(Continued)

*Primary Examiner* — Joseph W Drodge
(74) *Attorney, Agent, or Firm* — Flener IP & Business Law; Zareefa B. Flener

(57) ABSTRACT

A system for recovering ammonia from an ammonia-containing liquid, which system comprises a waste tank (10) for receiving ammonia-containing liquid entering the system; a filtration unit (14) comprising an ultrafiltration unit for receiving the ammonia-containing liquid from the waste tank (10) and filtering the ammonia-containing liquid to remove solids; an ammonia concentrating unit comprising a reverse osmosis unit (18) for receiving ammonia-containing liquid from the filtration unit (14) and concentrating the ammonia within the liquid; and an ammonia-recovery unit (100) for receiving concentrated ammonia-containing liquid from the ammonia concentrating unit (18) and recovering ammonia therefrom, wherein the ammonia-recovery unit (100) comprises a rectifier (102) for separating ammonia
(Continued)

from the concentrated ammonia-containing liquid and recovering the ammonia as ammonia-containing gas; and wherein the system does not comprise an ammonia stripper.

18 Claims, 1 Drawing Sheet

(51) Int. Cl.
| | |
|---|---|
| *C01C 1/10* | (2006.01) |
| *C02F 1/02* | (2023.01) |
| *C02F 1/04* | (2023.01) |
| *C02F 1/06* | (2023.01) |
| *C02F 1/10* | (2023.01) |
| *C02F 1/20* | (2023.01) |
| *C02F 1/44* | (2023.01) |
| *C02F 9/00* | (2023.01) |
| *C02F 101/16* | (2006.01) |
| *C02F 103/06* | (2006.01) |
| *C02F 103/20* | (2006.01) |
| *C02F 103/36* | (2006.01) |

(52) U.S. Cl.
CPC ............... *C02F 1/048* (2013.01); *C02F 1/06* (2013.01); *C02F 1/20* (2013.01); *C02F 1/441* (2013.01); *C02F 1/444* (2013.01); *C02F 2101/16* (2013.01); *C02F 2103/06* (2013.01); *C02F 2103/20* (2013.01); *C02F 2103/365* (2013.01); *C02F 2301/046* (2013.01); *C02F 2303/10* (2013.01)

(58) Field of Classification Search
CPC .............. C02F 2101/16; C02F 2103/06; C02F 2103/20; C02F 2103/365; C02F 2301/046; C02F 2303/10; C02F 1/02; C02F 1/04; C02F 1/08; C02F 1/106; C02F 1/44; C02F 1/445; C02F 1/586; C01C 1/024; C01C 1/10; C01C 1/02; B01D 1/00; B01D 1/0047; B01D 1/0094; B01D 1/22; B01D 61/02; B01D 61/025; B01D 61/04; B01D 61/14; B01D 61/145; B01D 61/147; B01D 61/20; B01D 2311/06; B01D 2311/1031; B01D 2311/25; B01D 2311/251; B01D 2311/2653; B01D 2311/2673; B01D 19/00; B01D 19/0073
See application file for complete search history.

(56) References Cited

U.S. PATENT DOCUMENTS

| | | | | |
|---|---|---|---|---|
| 2003/0173300 | A1* | 9/2003 | Bradley | B01D 21/0012 210/665 |
| 2012/0315209 | A1* | 12/2012 | Bisson | B01D 61/58 422/187 |
| 2014/0157846 | A1* | 6/2014 | Jeppson | C05F 17/50 71/61 |
| 2016/0368783 | A1* | 12/2016 | Ertel | C02F 1/048 |
| 2020/0017383 | A1* | 1/2020 | Heffernan | C02F 3/2853 |

FOREIGN PATENT DOCUMENTS

| | | | | |
|---|---|---|---|---|
| CN | 107417039 A | * | 12/2017 | |
| CN | 107512811 A | * | 12/2017 | ........... B01D 11/028 |
| CN | 108128965 A | * | 6/2018 | ............... C02F 9/00 |
| CN | 108275819 A | * | 7/2018 | ............... C01D 5/16 |
| CN | 109517786 A | * | 3/2019 | ............ A61K 35/14 |
| EP | 0976850 A2 | | 2/2000 | |
| JP | 2010149076 A | * | 7/2010 | |
| WO | 2022269229 A1 | | 12/2022 | |

OTHER PUBLICATIONS

English translation of Patent Publication CN-106430783A, published Feb. 2017. (Year: 2017).*
English translation of Patent Publication CN-107417039A, published Dec. 2017. (Year: 2017).*
English translation of Patent Publication CN-107512811A, published Dec. 2017. (Year: 2017).*
English translation of Patent Publication CN-108275819A, published Jul. 2018. (Year: 2018).*
English Translation of Publication CN-108128965-A, published Jun. 2018. (Year: 2018).*
English translation of Patent Publication CN-109517786, published Mar. 2019. (Year: 2019).*
International Preliminary Report on Patentability for Serial No. PCT/GB2022/051365; issued Sep. 15, 2023.
International Search Report for Serial No. PCT/GB2022/051365; issued Oct. 11, 2022.

* cited by examiner

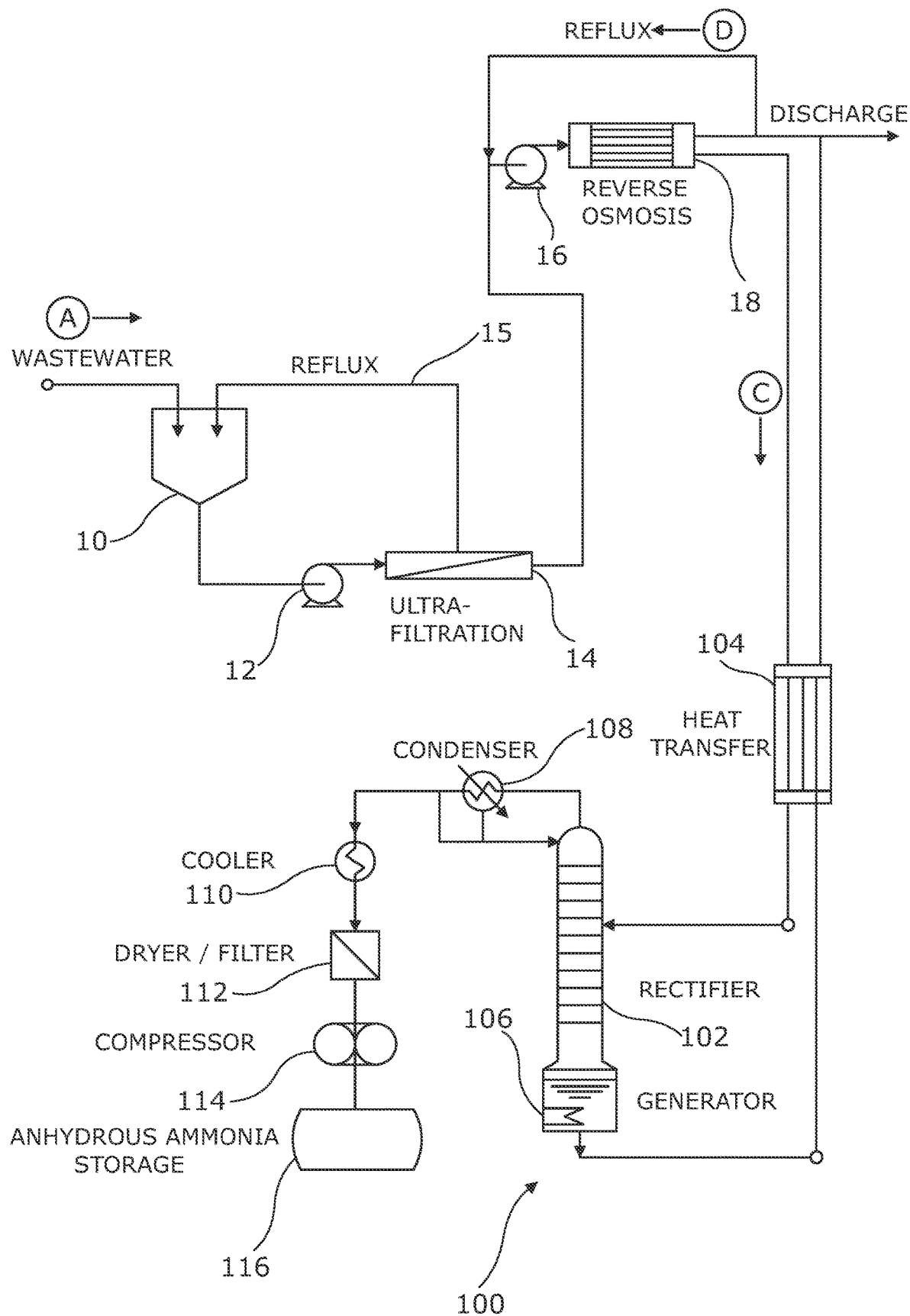

SYSTEM AND METHOD FOR RECOVERING AMMONIA FROM AN AMMONIA-CONTAINING LIQUID

The present invention relates to a system and method for recovering ammonia from an ammonia-containing liquid, such as wastewater, for example landfill leachate, effluent from anaerobic digesters, animal slurries, and in petrochemical applications.

Ammonia-containing liquids, for example wastewater such as landfill leachate and effluent from anaerobic digesters, must be made safe for discharge, and it is necessary to remove ammonia to requisite discharge standards.

There are two principal known methods of removing ammonia as a gas from liquid: the first is a chemical process that involves increasing the pH of the liquid, and the second is a thermal method that uses heat only. Both methods break the ionic bond that holds ammonia as $NH_4^+$ and converts the ammonia to $NH_3$, the free form. In large installations the chemical method is often used because the energy requirement for the thermal stripping of ammonia is prohibitive, and the cost of producing the necessary heat generally makes it economically unviable.

International patent publication WO 2012/110760 discloses a system for removing ammonia from landfill leachate which comprises an ammonia stripper for removing the ammonia from the leachate as an ammonia-containing gas, followed by decomposition of the ammonia in a thermal destructor. The thermal destructor can use heat from burning for example, methane contained in landfill gas, biogas or natural gas.

A disadvantage of the thermal decomposition of ammonia in a thermal destructor is that it requires combustion, which may not be possible in certain locations or jurisdictions. A further disadvantage of thermal decomposition of ammonia is the amount of heat energy which is required.

International patent publication WO 2020/039160 also discloses systems and methods for removing ammonia from an ammonia-containing liquid. The system comprises an ammonia stripper for stripping ammonia from the ammonia-containing liquid and discharging it as ammonia-containing gas. The ammonia-containing gas may be reacted with acid in an acid scrubber to form an ammonium salt, or scrubbed in a cold-water scrubber to remove the ammonia from the ammonia-containing gas as aqueous ammonium hydroxide, from which if desired liquid (anhydrous) ammonia may be recovered.

US 2021/0009481 discloses two different systems and methods for the recovery of ammonia from liquid and solid waste respectively, the former comprising the use of a waste tank, a concentrator, a filter, optionally a second concentrator, a heater, a stripper, a condenser, a water reclamation system and a collection unit.

Prior art systems and methods such as those described above thus use an ammonia stripper to strip ammonia from the ammonia-containing liquid and discharge it as ammonia-containing gas. This typically involves contacting the ammonia-containing liquid in counterflow with forced air and steam within the stripper, which requires heat. Thus, whilst ammonia strippers are effective at stripping ammonia-containing gas from ammonia-containing liquid, more energy-efficient systems and methods would be desirable.

The present invention seeks to provide an alternative system and method for recovering ammonia from an ammonia-containing liquid, which may be employed to reduce operating costs, in particular where waste heat or waste fuel is not available.

Thus, according to the present invention in a first aspect there is provided a system for recovering ammonia from an ammonia-containing liquid, which system comprises:
- a waste tank for receiving ammonia-containing liquid entering the system;
- a filtration unit comprising an ultrafiltration and/or microfiltration unit for receiving the ammonia-containing liquid from the waste tank and filtering the ammonia-containing liquid to remove solids;
- an ammonia concentrating unit for receiving ammonia-containing liquid from the filtration unit and concentrating the ammonia within the liquid; and
- an ammonia-recovery unit for receiving concentrated ammonia-containing liquid from the ammonia concentrating unit and recovering ammonia therefrom.

The system of the first aspect of the present invention may thus be used to recover ammonia from an ammonia-containing liquid without the use of an ammonia stripper. In the context of the present invention, "ammonia" is used herein in a general sense to include both ammonia ($NH_3$) and ammonia compounds (for example, ammonium ($NH_4^+$) compounds), unless a specific form of ammonia or ammonia compound is stated. The ammonia-containing liquid is preferably wastewater such as landfill leachate, effluent from anaerobic digesters, animal slurries, or from petrochemical applications. The fuel energy requirements of the system of the first aspect of the present invention are lower than those systems which employ an ammonia stripper. In addition, systems using strippers may not operate well with ammonia-containing liquids having a relatively high solids content. Accordingly, the system of the first aspect of the present invention may optionally not comprise an ammonia stripper.

The system of the present invention comprises a waste tank, such as a holding tank or buffer tank, into which the ammonia-containing liquid is fed prior to passing into the filtration unit. The principal purpose of the waste tank is to hold and regulate the flow of the ammonia-containing liquid prior to passing into the filtration unit, although the tank may also assist with the removal of particulate solids from the ammonia-containing liquid. For example, coagulation and/or flocculation reagents may be added before the ammonia-containing liquid enters the waste tank to promote agglomeration of finely suspended particles into larger and denser particles, which may be easier to remove than smaller less dense particles. Ammonia-containing liquid which has passed through the filtration unit may also be recycled back into the waste tank, for passing back through the filtration unit.

The system of the present invention comprises a filtration unit comprising an ultrafiltration and/or microfiltration unit for receiving the ammonia-containing liquid from the waste tank and filtering the ammonia-containing liquid to remove solids. Filtration of the ammonia-containing liquid in the filtration unit occurs before the ammonia-containing liquid enters the ammonia concentrating unit, and is preferably the first action performed on the ammonia-containing liquid after it passes from the waste tank.

The filtration unit comprises an ultrafiltration unit and/or a microfiltration unit. Ultrafiltration is a type of membrane filtration in which liquid is forced across a partially permeable membrane. Suspended solids and higher molecular weight solutes are removed in the retentate (i.e. the fraction of the feed which does not pass through the membrane of the ultrafiltration unit), with the solvent (e.g. water) and lower molecular weight solutes, including ammonia, passing through the membrane in the permeate (i.e. the fraction of the feed containing the ammonia, which does pass through the membrane of the ultrafiltration unit). Ultrafiltration membranes are generally defined by the molecular weight cut-off (MWCO) of the membrane used, or the membrane pore size. A typical ultrafiltration membrane pore size may be approximately $0.01 \times 10^{-6}$ m (micron). In the system of the present invention, the particular ultrafiltration membrane (s) to be used will depend upon the particular ammonia-containing liquid to be filtered, according to factors such as the source of the liquid, the solids content, and particle size distribution, as will be understood by a person skilled in the art.

Microfiltration is a similar process to ultrafiltration, but with a higher molecular weight cut-off or membrane pore size. A typical microfiltration membrane pore size may be approximately $0.1 \times 10^{-6}$ m (micron).

Ammonia-containing liquid will typically be recirculated through the filtration unit, to remove further solids after each pass through the unit.

Whilst the filtration unit used in the present invention comprises an ultrafiltration and/or microfiltration unit, other forms of filtration may also be used in the filtration unit.

The system of the present invention may comprise a buffer tank in the ammonia-containing liquid flowpath between the filtration unit and the ammonia concentrating unit, to hold filtered ammonia-containing liquid received from the filtration unit prior to passing into the ammonia concentrating unit.

The system of the present invention further comprises an ammonia concentrating unit, to concentrate the ammonia within the ammonia-containing liquid filtered by the filtration unit. It is to be noted that the ammonia-containing liquid must have previously been filtered in the filtration unit prior to being concentrated in the ammonia concentrating unit, because certain preferred techniques for concentrating the ammonia in the ammonia-containing liquid may not work on unfiltered ammonia-containing liquid.

The ammonia concentrating unit preferably concentrates ammonia in the ammonia-containing liquid through reverse osmosis, forward osmosis and/or evaporation. Thus, the ammonia concentrating unit may comprise a reverse osmosis unit, and/or a forward osmosis unit, and/or an evaporator.

Reverse osmosis is a process in which an applied pressure is used to counteract natural osmotic pressure, to force a solvent through a partially permeable membrane from an area of high solute concentration to an area of low solute concentration. The membrane allows the solvent but not the solute to pass through, with the consequence that the concentration of solute in the area of high solute concentration increases. Reverse osmosis can thus be used to separate solute from solvent.

In the system of the first aspect of the present invention, the ammonia concentrating unit may comprise a reverse osmosis unit, in which pressure may be applied to the ammonia-containing liquid, forcing the solvent (typically water) but not solute (ammonia) through a partially permeable membrane. In this way, the concentration of ammonia in the ammonia-containing liquid is increased, through the removal of solvent. This assists with subsequent recovery of ammonia from the concentrated ammonia-containing liquid.

Ammonia-containing liquid may pass through the reverse osmosis unit in a single pass, or may be recycled through the reverse osmosis unit for multiple passes.

The particular requirements of the reverse osmosis unit will depend upon the particular ammonia-containing liquid to be concentrated, as received from the filtration unit, as will be understood by a person skilled in the art.

Forward osmosis is a process which uses natural osmotic pressure to separate a solute from a solvent. Thus, in a typical forward osmosis process, a draw solution of higher concentration than the feed solution is used to induce a net flow of solvent through a partially permeable membrane into the draw solution, thus effectively separating the feed solvent from its solutes.

In the system of the first aspect of the present invention, the ammonia concentrating unit may comprise a forward osmosis unit, in which the solvent of the ammonia-containing liquid (typically water) but not solute (ammonia) flows through a partially permeable membrane. In this way, the concentration of ammonia in the ammonia-containing liquid is increased, through the removal of solvent. This assists with subsequent recovery of ammonia from the concentrated ammonia-containing liquid.

Ammonia-containing liquid may pass through the forward osmosis unit in a single pass, or may be recycled through the reverse osmosis unit for multiple passes.

The particular requirements of the forward osmosis unit will depend upon the particular ammonia-containing liquid to be concentrated, as received from the filtration unit, as will be understood by a person skilled in the art.

In the system of the first aspect of the present invention, the ammonia concentrating unit may comprise an evaporator, to concentrate ammonia within the ammonia-containing liquid. Thus, the ammonia concentrating unit may comprise a high surface area evaporator, for example a thin film evaporator. The evaporator may operate under heating or under a vacuum. Under vacuum, little or no heating may be required, since the reduced pressure reduces the boiling point of the liquid.

Concentrated ammonia-containing liquid, for example aqueous ammonium hydroxide, produced by the ammonia concentrating unit passes from the ammonia concentrating unit to an ammonia recovery unit, to recover the ammonia.

The system of the present invention may comprise a buffer tank in the ammonia-containing liquid flowpath between the ammonia concentrating unit and the ammonia recovery unit, to hold concentrated ammonia-containing liquid received from the ammonia concentrating unit prior to passing into the ammonia recovery unit.

Thus, the system of the first aspect of the present invention further comprises an ammonia recovery unit, for recovering ammonia from the concentrated ammonia-containing liquid The ammonia recovery unit may comprise a rectifier (or distillation column: the terms "rectifier" and "distillation column are used interchangeably herein) for separating ammonia from the concentrated ammonia-containing liquid. Thus, concentrated ammonia-containing liquid may pass from the ammonia concentrating unit into a rectifier, where it is heated to remove ammonia as an ammonia-containing gas. The ammonia-containing gas should contain a high proportion of pure ammonia gas ($NH_3$ (g)), with residual amounts of other materials, such as water vapour. The concentrated ammonia-containing liquid may be heated by a heater prior to passing into the ammonia recovery unit.

The ammonia recovery unit may comprise a heat exchanger, for recovering heat from liquid leaving the rectifier and transferring it to the concentrated ammonia-containing liquid entering the rectifier.

The ammonia recovery unit may further comprise a condenser, to condense ammonia within the ammonia-containing gas into liquid ($NH_3$(l)). The ammonia recovery unit may further comprise a cooler, to cool the liquid, and/or a drier for example comprising a drying agent/desiccant/water adsorbent, such as silica gel, to remove any remaining water from the liquid. The ammonia recovery unit may further comprise a compressor and/or a cryogenic circuit. The ammonia recovered by the ammonia recovery unit may be anhydrous liquid ammonia.

Alternatively, the ammonia may be recovered as an ammonia compound, such as an ammonium salt, for example ammonium hydroxide.

The system of the first aspect of the present invention preferably further comprises a collection unit, for collecting ammonia recovered from the ammonia-containing water, for example as anhydrous liquid ammonia or an ammonia compound, for example ammonium hydroxide.

According to the present invention in a second aspect there is also provided a method for recovering ammonia from an ammonia-containing liquid, which comprises the steps of:
    passing the ammonia-containing liquid from a waste tank into a filtration unit for filtering the liquid to remove solids;
    passing the ammonia-containing liquid from the filtration unit into an ammonia concentrating unit for concentrating the ammonia within the liquid; and
    passing the concentrated ammonia-containing liquid from the ammonia concentrating unit to an ammonia-recovery unit for recovering ammonia therefrom.

The method of the second aspect of the present invention is preferably performed using the system of the first aspect of the present invention.

The method of the second aspect of the present invention may recover the ammonia as liquid ammonia, for example anhydrous liquid ammonia.

Alternatively, the ammonia may be recovered as an ammonia compound, such as an ammonium salt, such as ammonium hydroxide.

The method of the second aspect of the present invention preferably does not employ a stripper to strip ammonia from the ammonia-containing liquid. Filtration of the ammonia-containing liquid in the filtration unit occurs before the ammonia-containing liquid enters the ammonia concentrating unit, and is preferably the first action performed on the ammonia-containing liquid after it passes from the waste tank.

The present invention will now be described in detail with reference to the accompanying drawing, in which:

FIG. 1 shows a process flow diagram for the system and method of the first and second aspects of the invention.

Thus, referring to FIG. 1, an embodiment of a system for recovering ammonia from an ammonia-containing liquid according to the first aspect of the present invention is shown. For the sake of this embodiment, the ammonia-containing liquid is ammonia-containing wastewater, but the system and method of the present invention are not limited in this way, and may potentially be used to recover ammonia from any ammonia-containing liquid.

The embodiment of the system shown in FIG. 1 comprises a waste tank 10 for receiving ammonia-containing water entering the system as indicated by arrow A, for holding the ammonia-containing liquid and regulating flow. The waste tank 10 may help to remove larger particulate solids from the ammonia-containing water. Coagulation and/or flocculation reagents may be added before the ammonia-containing water enters the tank 10 to promote agglomeration of finely suspended particles into larger and denser particles, which settle more quickly than smaller less dense particles. However, it is preferred that the use of such reagents is avoided if possible.

The ammonia-containing water passes from the waste tank 10 into a filtration unit 14 via pump 12, for removal of solids. In the illustrated embodiment, the filtration unit 14 comprises an ultrafiltration unit, but a microfiltration unit may additionally or alternatively be used. In the ultrafiltration unit 14 the ammonia-containing water is forced under pressure across a partially permeable membrane (not shown). Suspended solids and higher molecular weight solutes are removed in the retentate (i.e. the fraction of the feed which does not pass through the membrane of the ultrafiltration unit), with water and lower molecular weight solutes, including ammonia, passing through the membrane in the permeate (i.e. the fraction of the feed containing the ammonia, which does pass through the membrane of the ultrafiltration unit). The permeate contains the ammonia, and is pumped to an ammonia concentrating unit, comprising a reverse osmosis unit 18 in the illustrated embodiment, via pump 16. The retentate is recycled back into the tank for further processing via return channel 15. The ammonia-containing water may be recycled via return channel 15 to pass through the filtration unit 14 multiple times.

Thus, in the illustrated embodiment, the permeate passes to a reverse osmosis unit 18 via pump 16, to concentrate the ammonia within the ammonia-containing water. In the reverse osmosis unit 18, pressure is applied to the ammonia-containing water (permeate) within the reverse osmosis unit 18, forcing water but not the ammonia through a partially permeable membrane. In this way, the concentration of ammonia in the ammonia-containing water is increased, through the removal of water.

It is to be noted that in the system and method of the first and second aspects of the present invention, the ammonia concentrating unit may additionally or alternatively comprise a forward osmosis unit and/or an evaporator (not shown in FIG. 1) as described herein.

The concentrated ammonia-containing water passes from the reverse osmosis unit 18, as indicated by arrow C, to an ammonia recovery unit, generally indicated by reference 100, to recover ammonia. The unwanted water may be recycled back into the ammonia concentrating unit 18 for further recovery of ammonia, as indicated by arrow D, and/or may be discharged to waste.

In the embodiment shown in FIG. 1, the ammonia recovery unit 100 comprises a rectifier 102 for removing ammonia from the concentrated ammonia-containing water. The concentrated ammonia-containing water passes from the reverse osmosis unit 18 into a heat exchanger 104, for recovering heat from water leaving the rectifier 102 and transferring it to the concentrated ammonia-containing liquid entering the rectifier 102. The concentrated ammonia-containing water then passes into a generator 106, which heats the concentrated ammonia-containing water to generate ammonia-water vapour. This vapour passes upwards within the rectifier 102 where the ammonia vapour becomes increasingly pure, through the removal of water vapour. As discussed above, condensed water leaving the rectifier 102 passes through heat exchanger 104 prior to discharge.

In the illustrated embodiment, the ammonia vapour then passes from the rectifier 102 into a condenser 108, to condense the ammonia-containing gas into liquid. Liquid ammonia exiting the condenser 108 may be recycled into rectifier 102 for further removal of any residual water. In the embodiment shown in FIG. 1, the liquid ammonia is then cooled in a cooler 110, dried in a drier 112 to remove any remaining water, for example using a gas drying agent, compressed in compressor 114, and stored in collection unit 116 as anhydrous liquid ammonia.

The system and method of the first and second aspects of the present invention may be used to recover ammonia as anhydrous liquid ammonia, or an ammonia compound, such as an ammonium salt, for example ammonium hydroxide.

It will be appreciated that the specific embodiments described herein are for illustrative purposes only, and that further modifications and variations of the embodiments are possible without departing from the scope of the present invention as defined by the appended claims.

The invention claimed is:

1. A system for recovering ammonia from an ammonia-containing wastewater, which system comprises:
   a waste tank for receiving ammonia-containing wastewater entering the system;
   a filtration unit comprising an ultrafiltration unit and/or microfiltration unit for receiving the ammonia-containing wastewater from the waste tank and filtering the ammonia-containing wastewater to remove solids;
   an ammonia concentrating unit for receiving filtered ammonia-containing wastewater from the filtration unit and concentrating the ammonia within the wastewater;
   an ammonia-recovery unit for receiving concentrated ammonia-containing wastewater from the ammonia concentrating unit and recovering ammonia therefrom; and
   a collection unit for collecting ammonia recovered from the ammonia-containing wastewater;
   wherein the ammonia-recovery unit comprises a distillation column for separating ammonia from the concentrated ammonia-containing wastewater by heating the concentrated ammonia-containing wastewater to remove the ammonia as an ammonia-containing gas; and
   wherein the system does not comprise an ammonia stripper.

2. A system according to claim 1 configured to recirculate ammonia-containing wastewater through the filtration unit.

3. A system according to claim 1 wherein the ammonia concentrating unit comprises a reverse osmosis unit and/or a forward osmosis unit and/or an evaporator.

4. A system according to claim 1 wherein the ammonia concentrating unit comprises a reverse osmosis unit.

5. A system according to claim 4 configured such that in use ammonia-containing wastewater passes through the ammonia concentrating unit in a single pass, or is recycled through the ammonia concentrating unit for multiple passes.

6. A system according to claim 1 wherein the ammonia concentrating unit comprises an evaporator.

7. A system according to claim 6, wherein the evaporator comprises a thin film evaporator.

8. A system according to claim 6 wherein the evaporator operates under an at least partial vacuum.

9. A system according to claim 7 wherein the evaporator operates under an at least partial vacuum.

10. A system according to claim 1 comprising a heat exchanger for recovering heat from liquid leaving the distillation column and transferring it to the concentrated ammonia-containing wastewater entering the distillation column.

11. A system according to claim 10 wherein the ammonia recovery unit comprises a condenser, to condense ammonia contained within the ammonia-containing gas into liquid.

12. A system according to claim 11 wherein the ammonia recovery unit further comprises a cooler, to cool the liquid, and/or a drier to remove water from the liquid.

13. A method for recovering ammonia from ammonia-containing wastewater, which comprises the steps of:
   passing the ammonia-containing wastewater from a waste tank into a filtration unit for filtering the liquid to remove solids;
   passing the filtered ammonia-containing wastewater from the filtration unit into an ammonia concentrating unit for concentrating the ammonia within the wastewater; and
   passing the concentrated ammonia-containing wastewater from the ammonia concentrating unit to an ammonia-recovery unit for recovering ammonia therefrom;
   wherein the ammonia-recovery unit comprises a distillation column for separating ammonia from the concentrated ammonia-containing wastewater, wherein the concentrated ammonia-containing wastewater is heated to remove ammonia as an ammonia-containing gas; and
   wherein the method does not comprise the use of an ammonia stripper.

14. A method according to claim 13, wherein the ammonia is recovered as anhydrous liquid ammonia and/or an ammonia compound.

15. A method according to claim 14 wherein the ammonia is recovered as an ammonium compound and the ammonium compound is ammonium hydroxide.

16. A method according to claim 13 which is performed using a system that comprises:
   a waste tank for receiving ammonia-containing wastewater entering the system being located and arranged for passing of the ammonia-containing wastewater into a filtration unit;
   wherein the filtration unit comprising an ultrafiltration unit and/or microfiltration unit for receiving the ammonia-containing wastewater from the waste tank and filtering the ammonia-containing wastewater to remove solids;
   an ammonia concentrating unit for receiving the ammonia-containing wastewater from the filtration unit and concentrating the ammonia within the wastewater; and
   an ammonia-recovery unit for receiving the concentrated ammonia-containing wastewater from the ammonia concentrating unit and recovering ammonia therefrom;
   wherein the ammonia-recovery unit comprises a distillation column for separating ammonia from the concentrated ammonia-containing wastewater by heating the concentrated ammonia-containing wastewater to remove the ammonia as an ammonia-containing gas; and
   wherein the system does not comprise an ammonia stripper.

17. A method according to claim 16, wherein the ammonia is recovered as anhydrous liquid ammonia and/or an ammonia compound.

18. A method according to claim 17 wherein the ammonia compound is ammonium hydroxide.

* * * * *